United States Patent
Doose et al.

[15] 3,686,423
[45] Aug. 22, 1972

[54] METHOD OF COOLING LONG DISTANCE LOW TEMPERATURE ELECTRIC CONDUCTORS

[72] Inventors: Conrad Doose; Wolfgang Sassin, both of Julich, Germany

[73] Assignee: Kernforschungsanlage Julich Gesellschaft mit beschrankter Haftung, Julich, Germany

[22] Filed: Dec. 15, 1970

[21] Appl. No.: 98,232

[52] U.S. Cl............174/15 C, 174/DIG. 6, 307/147
[51] Int. Cl..............................................H01b 7/34
[58] Field of Search........174/15 C, DIG. 6, 16 R, 27, 174/16 B; 307/147

[56] References Cited

UNITED STATES PATENTS

| | | | |
|---|---|---|---|
| 3,541,221 | 11/1970 | Aupoix et al. | 174/15 C X |
| 3,529,071 | 9/1970 | Kafka | 174/15 C |
| 3,343,035 | 9/1967 | Garwin | 174/DIG. 6 |
| 3,562,401 | 2/1971 | Long | 174/15 C |
| 3,512,581 | 5/1970 | Lawton | 174/15 C X |

FOREIGN PATENTS OR APPLICATIONS

| | | | |
|---|---|---|---|
| 1,541,728 | 9/1968 | France | 174/DIG. 6 |
| 1,167,054 | 10/1969 | Great Britain | 174/15 C |

*Primary Examiner*—Lewis H. Myers
*Assistant Examiner*—A. T. Grimley
*Attorney*—Edwin E. Greigg

[57] ABSTRACT

In an electric power line system that includes legs formed of conduit assemblies carrying one or more coolants for maintaining the electric conductors and surrounding radiation shields at very low temperatures, the flow rate of each coolant through any cross section of the conduit assembly differs from the flow rate of the same type of coolant that passes, if at all, through the same cross section in an opposite direction.

7 Claims, 4 Drawing Figures

LEGEND

△  ELECTRIC POWER STATION

◎  DISTRIBUTING OR CONSUMING STATION

⊂⊃  MOBILE COOLANT CONTAINER

◊  STATIONARY COOLANT CONTAINER

———  FREE ELECTRIC POWERLINE

===  COOLANT CARRYING POWERLINE

+++++  RAILWAY OR ROAD

LEGEND

ELECTRIC POWER STATION

DISTRIBUTING OR CONSUMING STATION

MOBILE COOLANT CONTAINER

STATIONARY COOLANT CONTAINER

FREE ELECTRIC POWERLINE

COOLANT CARRYING POWERLINE

RAILWAY OR ROAD

METHOD OF COOLING LONG DISTANCE LOW TEMPERATURE ELECTRIC CONDUCTORS

BACKGROUND OF THE INVENTION

This invention relates to a method of and means for the long distance transmission of electric energy from one or more electric power generating stations to one or more consumers by means of low temperature electric conductors. The electric conductor or conductors are positioned in one or more tubular conduits in which refrigerated coolants, such as cooled or liquid gases having a boiling point about or under 77° K. circulate and which are surrounded by a vacuum jacket and by one or more heat radiation shields.

In known power line systems for the long distance transmission of electric energy, wherein the electric conductors are maintained at low temperatures, along the power lines there are provided refrigerating stations through which the coolant (or coolants, if several coolants are used) passes and in which the heat energy picked up in the power line system is removed.

In the above-outlined conventional power line systems the coolant flows are so directed that during normal — as opposed to the starting phase of the cooling process wherein condensation phenomena affect the mass flow of coolant — operation the coolant flow passing through any given cross-sectional area of the power line system in one direction, is identical to the coolant flow passing through the same cross-sectional area in the opposite direction.

In case a plurality of coolants are used, this condition has been heretofore regarded as a separate requirement for each and every coolant. Accordingly, for each and every coolant, along the entire length of the conductor, two separate conduits were necessary; one carrying the coolant in one direction, the other carrying it in the other, opposite direction. Power line systems are further known in which the individual electric conductors extend, with a single coolant, in vacuum jacketed conduits that are separated from one another.

For the purpose of decreasing heat effects, power line systems have been designed in which the electric conductors for carrying electricity in the one and in the other, opposite direction are disposed in a common vacuum jacket.

All these known systems have a number of disadvantages. In case the electric conductors are contained individually in separate vacuum jacketed tubes, the manufacture of lengths of such an assembly is relatively simple from a technological point of view, but the expenses relating to the power line system itself and the cost of installing the same are multiplied. It is a further significant disadvantage of this known power line system that in case of defect in one conductor assembly, the other conductor assemblies which form part of the same power line and which themselves are intact, cannot be used for the transmission of electric energy. In addition, because of the enlargement of the cold surfaces, the costs required for the cooling of the power line system are substantially increased. It is a further disadvantage that because of the relatively large spatial distance of the individual electric conductors, strong electric and magnetic fields appear which require additional measures because they do not cancel out by themselves. This is particularly the case if in the transmission of AC power, the eddy current losses have to be limited to a permissible magnitude. If the electric conductors carrying current in one and the other direction as well as the conduits carrying the coolant in two, opposite directions are disposed in a common vacuum jacket, the aforementioned disadvantages are eliminated, but other phenomena appear which, particularly in view of the mass production that is frequently required, have to be regarded as disadvantages. This is so, because in the last-mentioned structure a relatively large number of tubes and electric conductors have to be arranged in a narrowest possible space in such a manner that even under heavy duty conditions, which arise by virtue of extreme temperature fluctuations or alternating mechanical stresses, the electric and thermal insulations must remain unaffected. Further, because of the necessity of arranging spacer supports and guides which are in general relatively complex, the causes of heat effects and the danger of coolant leakage are multiplied. Consequently, the number of the necessary refrigerating stations along the power line system and thus also the refrigeration output has to be increased. Furthermore, the manufacture of such a power line system is itself wrought with significant difficulties and in particular, the execution of maintenance and repair operations such as necessary, for example, for the elimination of leaks in the vacuum system, are practically impossible without causing significant consequential disturbances.

OBJECT, SUMMARY AND ADVANTAGE OF THE INVENTION

It is an object of the invention to provide an improved power line system for the long distance transmission of electric energy from one or more electric power generating stations to one or more customers by means of cooled electric conductors, wherein a sufficient cooling of the electrical conductors is effected and further, the balance of coolant flow is adapted to the requirements in such an optimal manner that a particularly economical operation of the power line system is ensured and further, the installation of the latter may be effected in a simple manner.

In the power line system according to the invention, the aforenoted objects are achieved by ensuring that the flow rate of the coolant which passes through any cross-sectional area of the power line system during normal operation and which serves for the refrigeration of the electric conductors and/or the heat radiation shield, or the flow rate of partial flows of a coolant maintained at different temperatures or, if different coolants are used, the flow rate of each individual coolant differs from the flow rate of the associated, same type of coolant that flows, if at all, in the opposite direction.

Such a result is achieved very advantageously by providing that for the cooling of electrical conductors as well as for the cooling of the heat radiation shield, tubular conduits are provided in which each type of coolant or each coolant serving a different purpose (e.g. cooling the conductors or cooling the radiation shields), flows only in one direction at least during predetermined periods. The beginning and the end of the tubular conduits either coincide in which case a closed conduit loop is formed, or, said beginning and said end are at a distance from one another, in which case an open conduit loop is formed. In the latter case, there are provided containers for receiving the coolant from the conduit and/or known means in the conduits for periodically reversing the direction of the coolant flow.

The power line system according to the invention has the significant advantage that an interconnected network may be constructed by interconnecting one or more open or closed loop conduits through which flow may pass in one direction into a supply network matching the position of the power stations and the consumers. In this manner it is possible to supply electric energy from different power stations to consumers at different locations, while the repair, maintenance or construction work may be performed on the remainder of the power line system without disturbing effects. It may be advantageous if the containers for receiving the coolant are transportable (i.e. mobile) as known in the art.

The invention will be better understood as well as further objects and advantages of the invention will become more apparent from the ensuing detailed specification in conjunction with the drawing.

DESCRIPTION OF THE CONDUIT ASSEMBLIES FOR PRACTICING THE INVENTION

Figure 1:
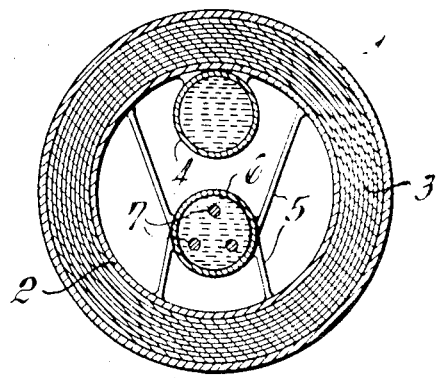
FIG. 1 is a cross-sectional view of a conduit assembly for practicing the invention.
Figure 2:
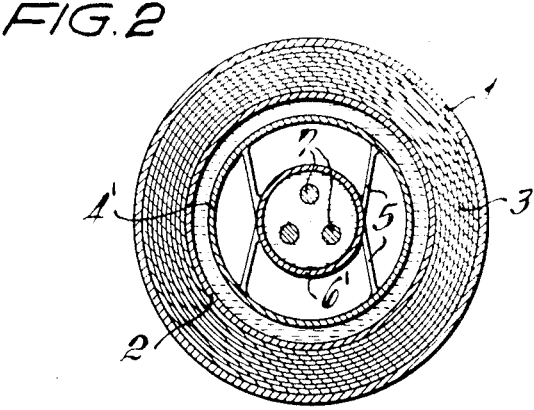
FIG. 2 is a cross-sectional view of another conduit assembly for practicing the invention.
Figure 3:
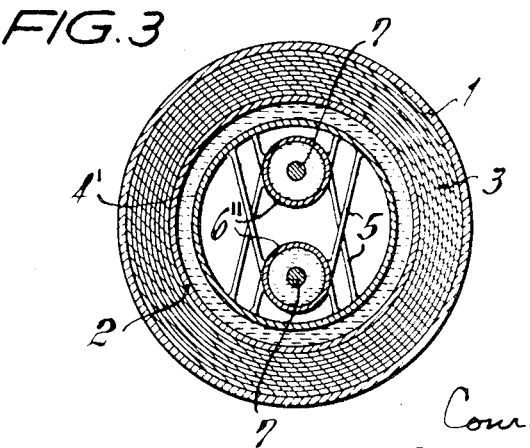
FIG. 3 is a cross-sectional view of still another conduit assembly for practicing the invention.

As seen in FIGS. 1–3, in all three conduit assemblies there are provided an outer tube 1, an inner, tubular radiation shield 2 and, preferably, additional highly heat-insulating layers 3. Components 1, 2 and 3 together form a cryogenic jacket for the thermal insulation of the electrical conductor system which is to be maintained at very low temperatures. The annular space between the tubes 1 and 2 is maintained at a vacuum below $10^{-4}$ mm Hg pressure.

Turning now to FIG. 1, for the cooling of the radiation shield there is provided a sole conduit 4, while the electric conductors 7 are disposed in a sole conduit 6 parallel spaced from conduit 4. This embodiment makes possible an operation wherein, for example, the conduit 4 may carry liquid nitrogen and the conduit 6 may carry liquid helium. In this manner, it is possible without difficulty, to cool the radiation shield in a sufficient manner and to maintain the operating temperature in the tube 6 at approximately 20° K. or below. The tube 6, as seen in the drawing, is supported internally of the radiation shield 2 by means of spacers 5. Thus, the coolant for the radiation shield and the coolant for the electric conductors may flow only in one direction in the conduits. Stated in different terms, there is no provision of an additional conduit to return the liquid nitrogen (forwarded in conduit 4) and/or another additional conduit to return the liquid helium (forwarded in conduit 6) to the refrigeration apparatus.

In the embodiment according to FIG. 2, the outer tube 1 and the radiation shields 2 and 3 are designed in a manner identical to the embodiment shown in FIG. 1. In the embodiment according to FIG. 2, however, the coolant conduit 4' for the radiation shield is arranged coaxially about the coolant conduit 6' for the electric conductors. The embodiments, both according to FIGS. 1 and 2, require a good thermal insulation between the two coolant conduits because of the temperature differences required during operation.

According to the embodiment illustrated in FIG. 3, in addition to the coolant conduit 4' for the cooling of the radiation shield 2, there are provided two coolant conduits 6'', each containing a single electric conductor 7. Both conduits 6'' may, according to requirements, carry coolants in opposite directions or in identical directions. In either case the aforenoted advantages apply, since there is an imbalance of flow for each coolant flow according to the invention.

In case the electric conductors are made of a superconductive material and for their refrigeration liquid helium or helium at elevated pressures in the vicinity of the thermodynamically critical point is used, it is particularly expedient to provide that the coolant associated with the electric conductors and the coolant associated with the radiation shield flow for predetermined periods only in one direction.

DESCRIPTION OF A POWER LINE NETWORK OPERATING ACCORDING TO THE INVENTION

Figure 4:
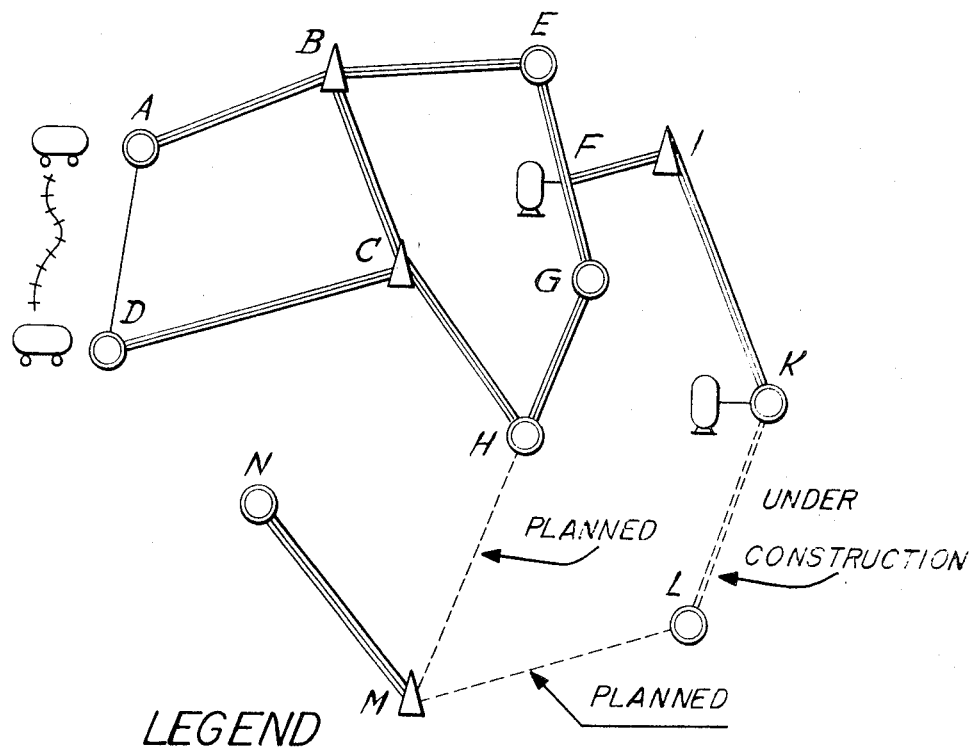
FIG. 4 is a schematic representation of an interconnected power line system according to the invention.
Figure 4:
Figure 4:
Figure 4:
Figure 4:
Figure 4:
Figure 4:
Figure 4:
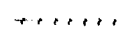

In FIG. 4 there is shown an electrical supply network formed of the power line system according to the invention and connecting energy producers with energy consumers. Only one part of the shown interconnected network shows the characteristics of the power line system to indicate the multiple possibilities of application. The remainder of the shown interconnected network — as it may be seen from the drawing — is formed of conventional free conductors.

In order to render the advantages of the new power line system fully recognizable, several legs of the system are shown as being under construction or only in a planning stage.

The drawing shows in particular the different possibilities of equalizing the flow balance which may be effected by using the power line system according to the invention. The drawing further indicates the extent to which it is possible to provide a supply network with optimum technical efficiency in an economical manner by utilizing the power line system according to the invention. Thus, in the embodiment shown in FIG. 4, there is shown a closed loop conduit system with junctions B, E, F, G, H, C and B, in which coolant circulates, for example, in a clockwise direction.

This closed loop system is joined by a loop A, B, C and D which is open as far as the circulation of coolant is concerned. In this loop the leg A—D is a conventional free line. The necessary equalization of the flow balance in this open loop occurs, as seen in the drawing, in a non-continuous manner by transporting the coolant in containers on rail or road between junctions A and D. Such an operation is particularly advantageous if the operating temperature of electric conductors is about or below 20° K. It has been found that the losses in a coolant conduit due to frictional heat during the required equalization by means of refrigeration apparatus require a relatively high refrigeration output because of the relatively poor efficiency of such apparatus which operate in the temperature range between approximately 10° and 300° K. Thus, the costs of operating the necessary refrigeration apparatus are significantly higher than the costs of moving the coolant over railway or road in containers in which the operational temperature is maintained. The use of mobile coolant containers is furthermore particularly advantageous if the transmission of electric energy is uneven, if a breakdown occurs in the refrigeration apparatus or if maintenance work has to be performed along some of the legs of the supply network.

In order to render a further advantage of the power line system according to the invention apparent, the quantity flow of the coolant circulating — also clockwise — in each conduit of legs A — B, B — C and C — D of the loop identified by junctions A, B, C and D, should be smaller than the quantity flow of the coolant circulating in the corresponding conduits of loop B, E, F, G, H, C and B. The latter flow rate should be smaller than the first-named flow rate by such an amount that the resulting differential flow in the leg B — C is sufficient to maintain the temperatures at operational level when in said leg no transmission of electric energy takes place. As seen, leg B — C connects two electric power stations. In general, a substantial amount of electric energy will have to be transmitted over the conductors in leg B — C only in case of a breakdown of either station at B or C.

If necessary, by reversing the direction of coolant flow in the loop A, B, C, D, A, the refrigeration output in the leg B — C may be increased to the detriment of the refrigeration output in legs B — E, E — F, F — G, G — H, and H — C, since now the coolants pertaining to the two loops flow in the same direction in leg B — C and therefore add, rather than subtract as originally designed.

As further seen, the legs F — I and I — K lead to a loop which is planned to be closed only in a future stage of construction and which will have junctions F, I, K, L, M, H, G and F. In the present stage of this loop, the flow balance is equalized by reversing the flow direction of the coolant which shuttles between the stationary coolant tanks disposed at terminal points F and K. A further significant advantage of the power line system according to the invention is recognizable from the fact that in the leg M — N the return of the coolant serving for cooling the electric conductors and now having a higher temperature, is effected partially through the coolant conduit connected with the radiation shield in a heat conducting manner. This leg M — N is adapted, after the completion of legs L — M and M — H, to be connected to the loop F, I, K, L, M, H, G and F. Such connection is so effected that the coolant flow is guided from the junction F through junctions I, K, L, M to the consumer at N and is returned through the radiation shield to the power station at M and therefrom guided through junctions H, G back to F at operating temperatures which are necessary for cooling the electrical conductors. The complete equalization of the coolant flow occurs by means of mobile containers travelling between junction N and M. With such a network arrangement, composable by virtue of the power line system according to the invention, it is possible to transmit the cooling energy from refrigerating stations which are disposed along the leg between the power station at M and the consumer station at N, to the adjoining legs L — M or also M — H or conversely.

As it can be seen from the foregoing discussion, a network for a large number of electric energy consumers may be constructed with ease by using a desired number of closed or open power line systems according to the invention, even in conjunction with legs formed of conventional power lines. Since the power line system according to the invention may be built with known structural components and further, a compact structure may be obtained with ease, the cost of material compared to the transmission systems known heretofore for the transmission of electric energy over long distances by means of low temperature electric conductors is substantially lowered.

It is a further advantage that for the cooling of the radiation shield and the electric conductors in a desired number of legs preferably helium can be used, since the flow in an interconnected network may be designed with ease in such a manner that the direction of flow in the coolant conduit associated with the radiation shield may be opposed to the direction of flow in the coolant conduit associated with the electric conductors. In this manner, it is possible to continuously and completely equalize the flow balance. Or, if desired, in case of an only partial return of the coolant with different thermodynamic conditions with respect to the conduit in which the coolant flow serves for cooling the electric conductors, such equalization may may be effected according to a predetermined manner, as the requirements dictate.

What is claimed is:

1. A method of cooling a power line system for transmitting electric energy from electric power generating means to consumers over long distances by means of low temperature electric conductors disposed in conduit assemblies that include coolant-carrying conduits and radiation shield means surrounding said conduits, said coolants serving for the cooling of said electric conductors and said radiation shield means, comprising the step of advancing said coolants in said system in an open coolant circuit in such a manner that during normal operation the sum of the flow rate of each coolant passing in one and the other direction through any give cross-sectional area of a conduit assembly is other than zero and returning said coolants to their starting point.

2. A method as defined in claim 1, including the step of periodically reversing the coolant flow for causing said coolant to travel alternately in opposite directions in the same conduit for predetermined periods.

3. A method as defined in claim 1, including the step of advancing a coolant in said conduit assembly in the one direction and returning a coolant in said conduit assembly spaced from said first named coolant.

4. A method as defined in claim 1, including the step of circulating the coolant for cooling the electric conductors and the coolant for cooling the radiation shield means only in one direction in their respective conduits for at least predetermined periods.

5. A method as defined in claim 1, including the step of transporting said coolant in mobile containers from the end to the beginning of an open loop conduit system forming part of said power line system.

6. A method as defined in claim 1, including the steps of periodically reversing the coolant flow in an open loop conduit system and directing at least one portion of the coolant used in one direction of its flow, for the cooling of the electric conductors, into a conduit for cooling said radiation shield means in the other, opposite direction of its flow.

7. A method as defined in claim 1, including the step of circulating each coolant in its respective conduit continuously and unidirectionally in a closed loop conduit system forming part of said power line system.

* * * * *